Patented Aug. 11, 1931

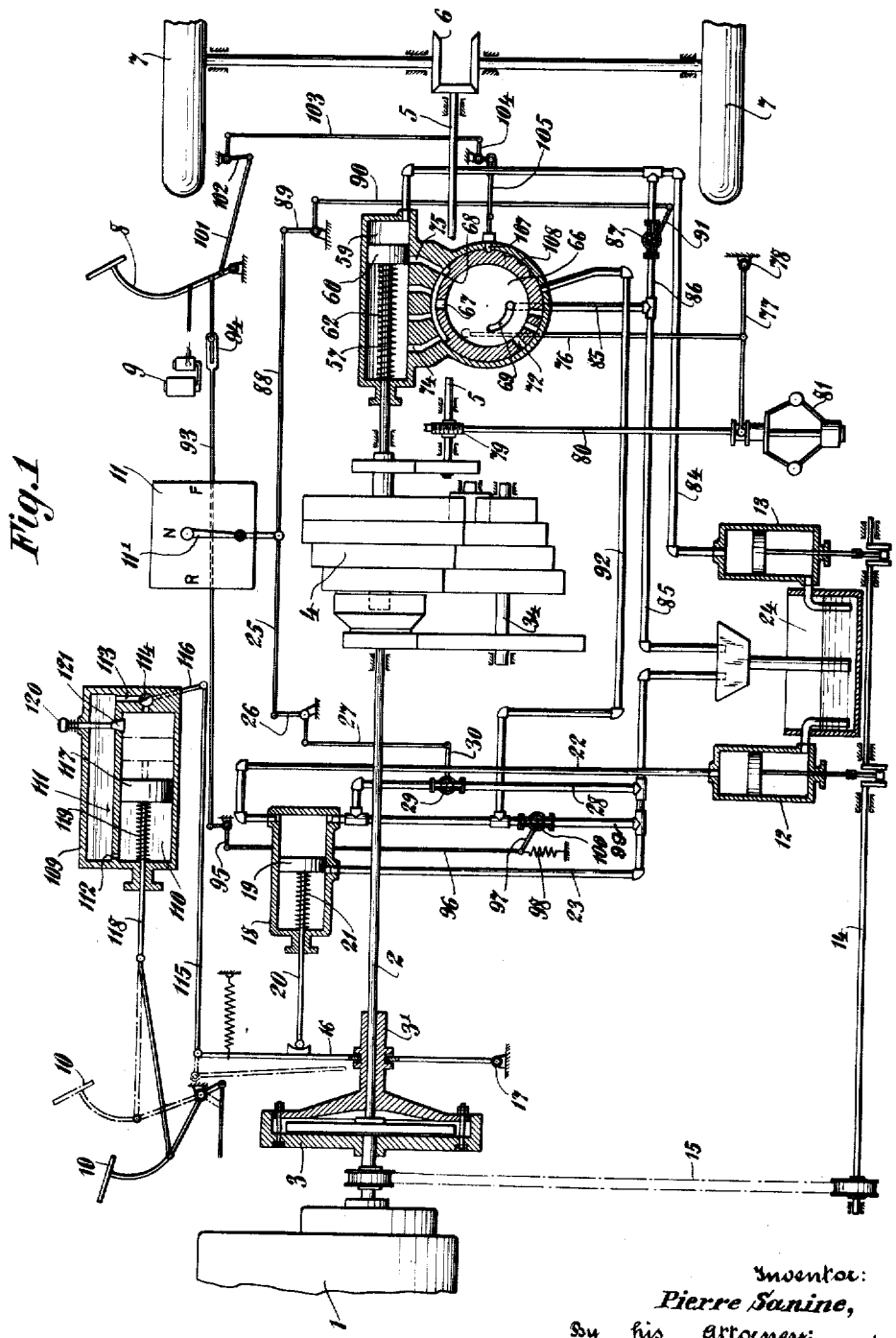

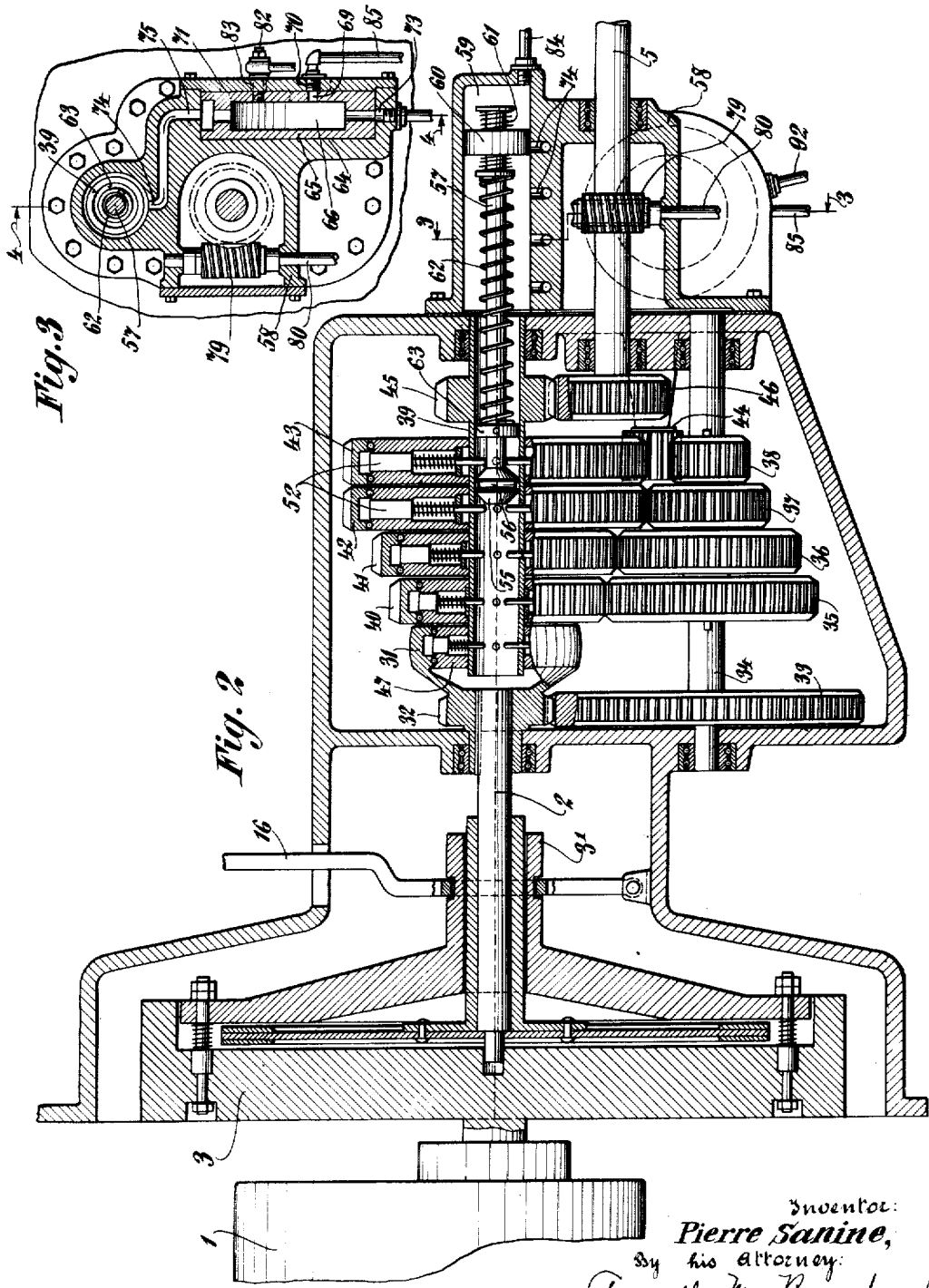

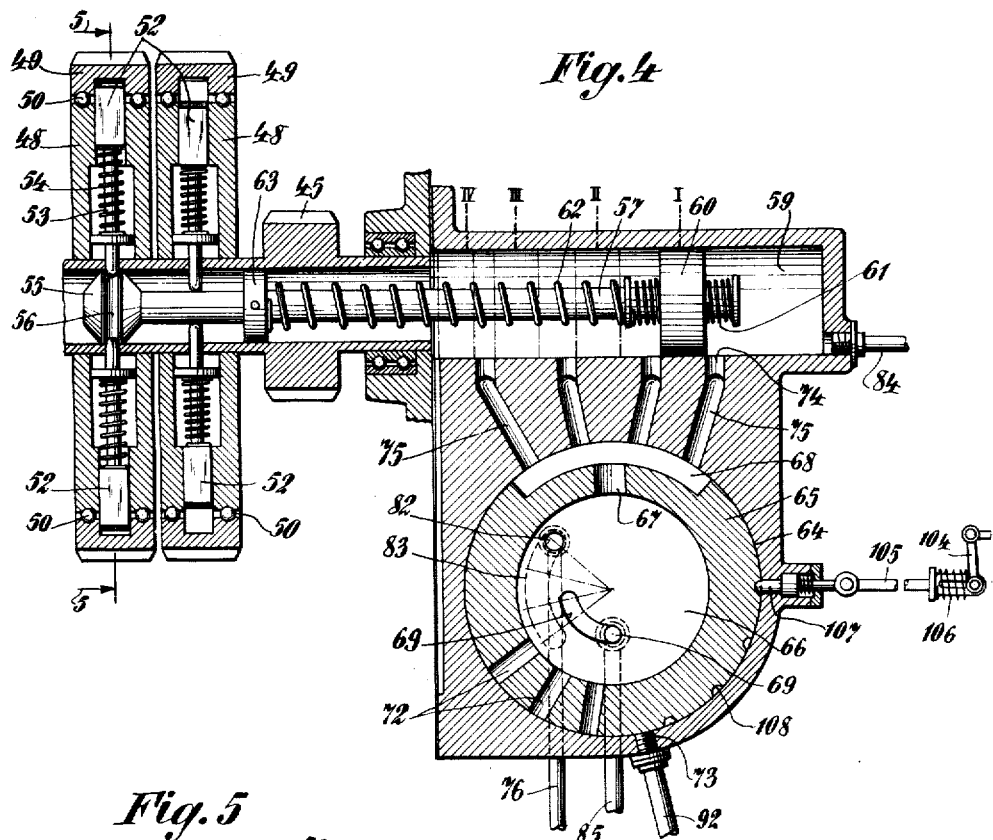
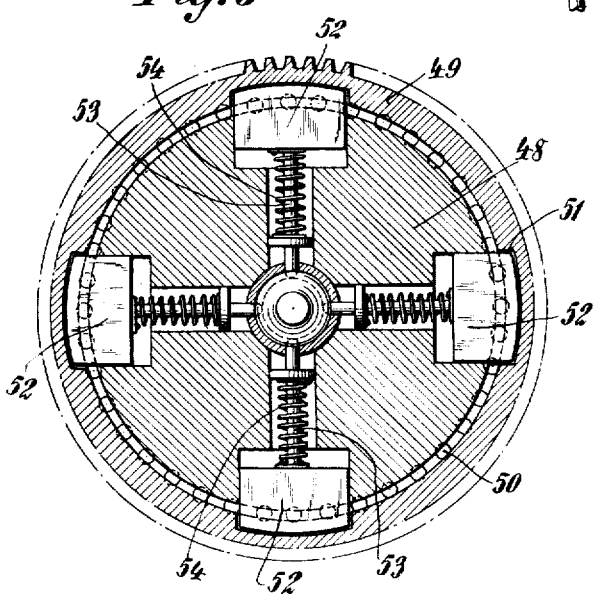

1,818,910

UNITED STATES PATENT OFFICE

PIERRE SANINE, OF NICE, FRANCE, ASSIGNOR OF ONE-FOURTH TO CLAUDE E. MOORE, OF NICE, FRANCE

AUTOMATIC CHANGE SPEED MECHANISM

Application filed August 16, 1929, Serial No. 386,401, and in France December 21, 1928.

The present invention relates to change speed mechanisms for motor vehicles and embodies, more specifically, an improved mechanism which operates semi-automatically in accordance with the rate of acceleration of the vehicle.

Although devices have been designed to simplify the operations of changing the gear ratio between the engine and final drive of a vehicle, they have been predicated upon the successive manual initiations of the respective change speed operations, thus requiring close supervision by the operator of the vehicle. In the hands of the average driver, the driving parts frequently receive severe strains due to faulty shifting and the meshing of gears at vehicle speeds which are not correct for the respective shifting operations.

In avoiding the above objectionable characteristics in the conventional type of change speed mechanism, the present invention entirely eliminates manual initiations of the individual shifting operations and provides an apparatus which automatically effects the shifting at the most favorable time, manual supervision only being required in so far as the starting and stopping of the vehicle is concerned.

It is, accordingly, an object of this invention to provide a mechanism which accelerates the vehicle by automatically changing the gear ratios between the driving and driven elements.

It is a further object of the invention to provide a device of the above character which automatically shifts the transmission gears progressively in accordance with the rate of acceleration of the vehicle.

A further object of the invention is to incorporate in a device of the character described above, a degree of manual supervision whereby the starting and stopping operations will be manually controlled, the building up in speed of the vehicle being supervised by the manual control of the engine throttle.

Yet another object of the invention is to provide a device of the above character which is simple in operation and construction and capable of being incorporated in the conventional type of vehicle construction.

Moreover, the present invention embodies a means for insuring correct operation thereof, incorrect accidental manipulation of the vehicle controls thereby having no effect upon the movements of the vehicle.

It is furthermore understood that the invention may be applied to a stock model or incorporated in the original design thereof, only slight structural changes being required to adapt it to either use. The broad principles of the invention therefor may be incorporated in all forms of vehicles where a progressive change speed transmisison is used, notwithstanding the fact that the following description refers to a construction in which the invention has been illustrated as embodied in an original vehicle design.

Further objects and advantages not specifically enumerated above will be apparent as the invention is described in connection with the accompanying drawings, wherein:

Figure 1 is a diagrammatic illustration of a vehicle transmission in which the present invention has been embodied.

Figure 2 is a view in section taken longitudinally through the transmission housing, and showing the means for effecting a desired change of gears.

Figure 3 is a segmental view in section, taken on line 3—3 of Figure 2, and looking in the direction of the arrows.

Figure 4 is a view in section, taken on line 4—4 of Figure 3, and looking in the direction of the arrows.

Figure 5 is a detail view, showing the specific form of mechanism for clutching gears to the lay shaft.

In order that the invention may be understood more readily, the structural elements will first be described, their respective functions briefly being ascribed thereto, the operation of the device then being set forth in detail following the structural description thereof.

Referring to the accompanying drawings, an internal combustion engine of conventional type is illustrated diagrammatically at 1, this engine driving a shaft 2 in which a clutch 3 of any desired type is inserted. A change speed transmission 4 receives power from shaft 2 and drives a propeller shaft 5 which, in turn, delivers power to the final drive 6 and wheels 7.

The usual accelerator pedal 8 is shown diagrammatically as controlling the throttle 9 of the engine, and the vehicle brake pedal is shown at 10. At some convenient location within reach of the operator of the vehicle, as for example on the vehicle dash, a supervisory manual control 11 is mounted, this control setting the device either in neutral, or for forward or reverse operation.

In the preferred form of the invention, a fluid is utilized as the medium through which the device is operated, and in order to afford a source of fluid pressure, pumps 12 and 13 are provided, these pumps being driven by a shaft 14 which receives power from shaft 2 through a suitable connection which has here been diagrammatically illustrated as a pulley and belt connection 15.

The clutch is actuated through a collar 3', to which movement is imparted by a lever 16 fulcrumed at 17. A clutch cylinder 18 slidably carries a piston 19 connected to lever 16 through a rod 20. Movement of the piston and lever to disengage the clutch is effected by a compression spring 21 and movement to engage the clutch is brought about by a fluid pressure within the cylinder.

As clearly seen in Figure 1, this fluid pressure is supplied by pump 12 through pipe 22, return pipe 23 carrying the fluid to a common sump 24 between pumps 12 and 13. When the piston has moved sufficiently to engage the clutch, pipe 23 communicates with the cylinder and prevents further building up of pressure in back of the piston, thus holding the clutch in engaged position.

In order that the mechanism may be set in a neutral position where movement of the vehicle cannot be accidentally effected, a manually controlled lever 11' is connected to a rod 25 which is connected through a bell crank lever 26 with a rod 27. A pipe 28 communicates with the pressure side of the cylinder 18 and returns fluid, under certain conditions, to the sump 24, thus preventing movement of the piston 19. In this pipe 28, a valve 29 is fitted, lever 30 enabling movement of the rod 27 to actuate the valve. When the lever 11' is in neutral position, the valve 29 is open, thus permitting free circulation of the fluid through pipes 22 and 28 without affecting the piston 19. When the manual lever 11' is moved to either forward or reverse positions, valve 28 is closed and the clutch is thus operated.

Referring more particularly to Figures 2, 3, 4 and 5, the speed change mechanism and operating means therefor includes a female driving clutch member 31 which is mounted on driving shaft 2. This member is formed with gear teeth 32 for engaging a constant mesh gear 33 on a counter shaft 34. Stepped gears 35, 36, 37 and 38 on shaft 34 provide high, intermediate, low and reverse speeds respectively.

A hollow lay shaft 39 carries constant mesh gears 40, 41, and 42 engaging respectively with gears 35, 36, and 37 and additionally carries a gear 43 for the reverse driving connection. A reverse idler 44 is connected between gears 38 and 43 to provide a reversal of rotation between shafts 34 and 39 when the drive is through gears 38 and 43. A pinion 45 on lay shaft 39 drives a gear 46 on the propeller shaft 5 to transmit the drive to the wheels. Direct drive is afforded through a male clutch member 47 which cooperates with clutch member 31 in a manner described hereinafter.

Gears 43, 42, 41, 40 and clutch member 47 are formed with hubs 48, the gear teeth being formed on annular members 49 which are carried on the hubs through bearings 50. Recesses 51 in the annular members receive clutch members 52 which are mounted on shafts 53 carried in the hubs 48. Tensile springs 54 normally retract the clutch members 52 and permit relative rotation between the toothed annular members and the hubs. The shafts 53 extend into the hollow portion of the lay shaft 39 and are engaged by an axially movable dog 55 formed with a circumferential groove 56. It will thus be seen that the dog 55, by appropriate axial movement, may simultaneously engage the shafts 53 of the respective hubs to lock such hubs with their respective annular toothed members.

This movement of the dog is effected through a shaft 57 upon which the dog 55 is mounted. An auxiliary housing 58, mounted on the transmission housing, is formed with a cylinder 59 within which a piston 60 moves. This piston is mounted upon shaft 57 with provision for slight axial movement with respect thereto through springs 61. A coil spring 62 seated against a collar 63 pinned to lay shaft 39 serves to urge the piston 60 normally to the right as viewed in Figure 2.

In the housing 58, a fluid chamber 64 is formed, a valve body 65 being rotatably mounted therein, as clearly shown in Figures 3 and 4. The valve body is formed with a central chamber 66 communicating through passage 67 with an elongated port 68. An arcuate port 69 formed in the lateral face of the valve body communicates with a port 70 in the face plate 71 of housing 58. Radial passages 72 in the valve body 65 are adapted to register with a return port 73 during that portion of the movement of the piston 60 to effect a change of gears to relieve the fluid pressure in the clutch cylinder 18, thus preventing engagement of the clutch during a change of gears. Port 73 communicates with pipe 92, thus permitting the fluid in cylinder 18 to flow through pipe 92, port 73, passages 72, valve chamber 66 and pipe 85, back to the pumps.

Along the length of cylinder 59, ports 74 are formed, these ports being spaced in accordance with the axial spacing of shafts 53. Passages 75 connect the respective ports with the chamber 64 in such manner that the elongated port 68, during rotation of the valve body, successively cuts off or establishes communication between the passages and the interior of the valve body.

Rotative movement is imparted to the valve body through a rod 76 connected to a lever 77 which is fulcrumed at 78. A power take-off 79 connected with the propeller shaft 5 drives a shaft 80 which rotates a speed responsive device 81. This device moves lever 77 in accordance with the speed of the propeller shaft and thus the movement of rod 76 is imparted to the valve body through a pin 82 which moves in an arcuate slot 83 in the face plate 71.

Fluid pressure is supplied to the cylinder 59 from pump 13 by a pipe 84, the return of the fluid to the sump from the chamber in the valve body 65 being effected by pipe 85 which communicates with port 70. It will be understood that in neutral position, the clutch 3 is disengaged, as described above. It is therefore permissible to have any of the gears engaged at this time, and the proposed construction causes the low speed gears to be engaged when the device is set in neutral position. Fluid pressure from pipe 84 moves piston 60 to the left, as viewed in Figures 1, 2, and 4 and causes the right hand port 74 to communicate with the cylinder 59. Further movement of the piston now ceases and fluid flows from the cylinder, through port 74 and passage 75 into port 68. From this port it passes through passage 67 into the chamber 66, through ports 69 and 70 to pipe 85.

As the vehicle speeds up, and the accelerator pedal successively released, the valve body will be moved to close communication successively between the passages 75 and the chamber 66, thus causing the further building up of pressure successively behind the piston to engage the corresponding gears.

It will be seen that reverse speed is obtained by movement of the piston 60 to the right from the first speed position. Ordinarily the trapped body of fluid behind the piston prevents such movement. Relief of the pressure of this fluid is obtained upon movement of the manual lever 11' to the reverse position through the following mechanism. A pipe 86 by-passes the valve body 65 and connects pipe 84 with pipe 85. A valve 87 is closed in the neutral and forward positions of the lever 11' but when this lever is moved to the reverse position, the valve is opened, movement of the lever being transmitted to the valve through rod 88, bell crank lever 89, rod 90 and valve lever 91. In this manner the trapped fluid flows through the by-pass into the sump 24, spring 62 moving the piston 60 into the reverse position.

In order that a gear change may be effected only when the clutch is disengaged and the engine idling, an accelerator control is provided as follows. Accelerator pedal 8 is connected to a rod 93 in which a lost motion connection 94 is included. Rod 93 is connected to bell crank lever 95 which transmits its motion to rod 96, lever 97 and valve 100. The latter is connected in a by-pass pipe 99 to relieve the fluid pressure in the clutch cylinder when the pedal is in its normal position. Spring 98 normally maintains the valve 100 in a closed position, lost motion connection 94 permitting further motion of pedal 8 after having closed the valve, without further affecting it.

The means for preventing a gear change during acceleration of the vehicle under increasing engine speed until the clutch is disengaged, includes a rod 101 connected to the accelerator pedal 8 and a bell crank lever 102. The latter is connected to a rod 103 and bell crank lever 104 to transmit movement of the pedal to a rod 105. A lost motion connection 106 is preferably included between rod 105 and lever 104 to permit further depression of the pedal 8 after locking of the valve 64 has been effected. Rod 105 is mounted in the valve housing 58 and carries a spring pressed plunger 107 for engaging spaced notches 108 in the valve plug 64. When the pedal 8 is depressed to speed up the engine, the valve plug is locked to prevent the speed controlled mechanism from changing the gears. Only when the accelerator pedal is released and the clutch disengaged, can such gear change be effected.

The operation of the foregoing mechanism will be apparent from its description. When the engine is started, the pumps 12 and 13 provide a source of pressure which is utilized to operate the clutch and change speed mechanism. The vehicle, being at rest, is set in motion by moving lever 11' to forward or reverse position, as desired, and depressing pedal 8 to close valve 100. Valve 29 is accordingly closed and the clutch is engaged to start the vehicle. If moving in a forward direction, pedal 8 is depressed to accelerate sufficiently to get into second, or intermediate gear. Such gear change is prevented by the plunger 107 which locks the gear changing mechanism during such acceleration. The pedal is, of course, then released, opening valve 100 and releasing plunger 107. The speed responsive device then moves the valve plug until the second passage 75 is closed, causing the pressure in cylinder 59 to move piston 60 to the left, as viewed in Figure 4, until the third port 74 and passage 75 is opened. The pedal 8 is again depressed and further acceleration takes place until the vehicle is finally running in high gear.

To prevent accidental release of the service brakes when the vehicle is parked, a locking device of the following type is provided. A housing 109 is mounted on the chassis and formed with a cylinder 110 and chamber 111. Passages 112 and 113 communicate between the cylinder and chamber and a valve 114 serves to close passage 113. A rod 115 is connected to the valve lever 116 and serves to close the valve when the clutch is disengaged.

Within the cylinder, a piston 117 is provided, this piston being connected to the brake pedal 10 by a rod 118. A spring 119 normally urges the piston and lever to the right, as viewed in Figure 1. When the clutch is engaged, the movement of the piston 117 is unrestricted and braking may be effected. When the brakes are applied and the clutch is disengaged, the valve 114 is closed and the brakes are locked to prevent movement of the vehicle. Such condition may be relieved by depressing plunger 120 which opens the one way valve 121 and releases the brake pedal.

While the invention has been described in connection with the specific construction shown in the accompanying drawings, it is obvious that changes in construction, form and arrangement of parts may be made without departing from the scope of the invention. The pressure system may be operated by the vacuum in the intake manifold and other changes may be made without avoiding the invention as defined in the appended claims.

I claim as my invention:

1. In combination with an engine, clutch and change speed mechanism having a reverse position, means driven by the change speed mechanism, an engine created pressure source, means operated by the pressure for operating the clutch, means operated by the pressure for operating the change speed mechanism, said means normally maintaining the change speed mechanism in a forward position, means to move the change speed mechanism into a reverse position, means controlled by the speed of the driven means for controlling the operation of the change speed mechanism in the forward positions, an engine controlling means, means operated thereby for operating the clutch controlling means, means operated thereby for preventing operation of the change speed mechanism when the clutch is engaged, and manual means for relieving pressure on the clutch controlling means and the change speed operating means whereby the reverse operating means is free to move the latter to a reverse driving position.

2. In combination with an engine, clutch and change speed mechanism having a reverse position, means driven by the change speed mechanism, an engine created pressure source, means operated by the pressure for operating the clutch, means operated by the pressure for operating the change speed mechanism, said means normally maintaining the change speed mechanism in a forward position, means to move the change speed mechanism into a reverse position, means controlled by the speed of the driven means for controlling the operation of the change speed mechanism in the forward positions, manual means for relieving pressure on the clutch operating means, and means actuated by the manual means for relieving pressure on the pressure operated change speed controlling means to free the reverse operating means to effect a reverse driving position.

3. In combination with an engine, clutch and change speed mechanism having a reverse position, means driven by the change speed mechanism, an engine created pressure source, means operated by the pressure for operating the clutch, means operated by the pressure for operating the change speed mechanism, said means normally maintaining the change speed mechanism in a forward position, means to move the change speed mechanism into a reverse position, means controlled by the speed of the driven means for controlling the operation of the change speed mechanism in the forward positions, and means to relieve the pressure on the last named means to free the reverse operating means to effect a reverse driving position.

4. In combination with an engine, clutch, and change speed mechanism, means driven by the change speed mechanism, an engine driven pressure producing means, means operated by the pressure for operating the change speed mechanism, means operated by the pressure for operating the clutch, means controlled by the speed of the driven means for controlling the operation of the change speed mechanism, engine controlling means for relieving pressure upon the pressure operated clutch controlling means, and manual means for relieving pressure on the last named means.

5. In combination with an engine, clutch, and change speed mechanism, means driven by the change speed mechanism, an engine driven pressure producing means, means operated by the pressure for operating the change speed mechanism, means operated by the pressure for operating the clutch, means controlled by the speed of the driven means for controlling the operation of the change speed mechanism, engine controlling means for controlling the pressure operated clutch controlling means, and separate means for preventing actuation of the clutch controlling means.

6. In combination with an engine, clutch, and change speed mechanism, means driven by the change speed mechanism, an engine driven pressure producing means, means operated by the pressure for operating the change speed mechanism, means operated by the pressure for operating the clutch, means controlled by the speed of the driven means for controlling the operation of the change speed mechanism, and engine controlling means for controlling the pressure operated clutch controlling means.

7. In combination with a clutch and change speed mechanism, means driven by the change speed mechanism, a source of pressure, means operated by the pressure for operating the clutch, means operated by the pressure for operating the change speed mechanism, means controlled by the speed of the driven means for controlling the operation of the last named means, separate means for controlling the pressure operated clutch controlling means, and means operated by the pressure operated change speed controlling means for relieving the pressure on the clutch controlling means during actuation of the former.

8. In combination with a clutch and change speed mechanism, means driven by the change speed mechanism, a source of pressure, means operated by the pressure for operating the clutch, means operated by the pressure for operating the change speed mechanism, means controlled by the speed of the driven means for controlling the operation of the last named means, separate means for controlling the pressure operated clutch controlling means, and means operated by the pressure operated change speed controlling means for preventing engagement of the clutch by the clutch controlling means during actuation of the former.

9. In combination with an engine, clutch, and change speed mechanism, means driven by the change speed mechanism, an engine created pressure source, means operated by the pressure for operating the clutch, means operated by the pressure for operating the change speed mechanism, means controlled by the speed of the driven means for controlling the operation of the last named means, and means to actuate the pressure operated clutch controlling means to disengage the clutch when the accelerator pedal is in its normal position.

10. In combination with an engine, clutch, and change speed mechanism, an accelerator pedal, means driven by the change speed mechanism, an engine created pressure source, means operated by the pressure for operating the clutch, means operated by the pressure for operating the change speed mechanism, means controlled by the speed of the driven means for controlling the operation of the last named means, and means operated by the accelerator pedal when moved to its normal position to actuate the pressure operated clutch controlling means to disengage the clutch.

11. In combination with an engine, clutch, and change speed mechanism, an engine controlling means, means driven by the change speed mechanism, an engine created pressure source, means operated by the pressure for operating the clutch, means operated by the pressure for operating the change speed mechanism, means controlled by the speed of the driven means for controlling the operation of the last named means, and means operated by the engine controlling means for controlling the pressure operated clutch controlling means.

12. In combination with an engine, clutch, and change speed mechanism, means driven by the change speed mechanism, an engine created pressure source, means operated by the pressure for operating the clutch, means operated by the pressure for operating the change speed mechanism, means controlled by the speed of the driven means for controlling the operation of the last named means, and separate means for controlling the pressure operated clutch controlling means.

13. In combination with a clutch and change speed mechanism, means driven by the change speed mechanism, a source of pressure, means operated by the pressure for operating the clutch, means operated by the pressure for operating the change speed mechanism, means controlled by the speed of the driven means for controlling the operation of the last named means, manual means for controlling the pressure operated clutch controlling means, and means operated by the manual means for preventing actuation of the pressure operated change speed controlling means until disengagement of the clutch by the pressure operated clutch controlling means.

14. In combination with a clutch and change speed mechanism, means driven by the change speed mechanism, a source of pressure, means operated by the pressure for operating the clutch, means operated by the pressure for operating the change speed mechanism, means controlled by the speed of the driven means for controlling the operation of the last named means, and manual means for controlling the pressure operated clutch controlling means and the pressure operated change speed controlling means.

15. In combination with a clutch and change speed mechanism, means driven by the change speed mechanism, a source of pressure, means operated by the pressure for operating the clutch, means operated by the pressure for operating the change speed mechanism, means controlled by the speed of the driven means for controlling the operation of the last named means, and separate means for controlling the pressure operated clutch controlling means.

16. In combination with a clutch and change speed mechanism having a reverse speed position, means driven by the change speed mechanism, means controlled by the speed of the change speed driven means to vary the change speed mechanism, said means normally maintaining a speed change effecting position, means to disengage the clutch, manually operated means to prevent the engagement of the clutch, and means operated by the last named means to effect the reverse speed position.

17. In combination with a clutch and change speed mechanism, means driven by the change speed mechanism, means for operating the clutch, means for operating the change speed mechanism, means controlled by the speed of the driven means for controlling the operation of the last named means, said means normally maintaining a speed change effecting position, and means to actuate the last named means to effect the reverse speed position.

This specification signed this 5 day of August A. D. 1929.

PIERRE SANINE.

15. In combination with a clutch and change speed mechanism, means driven by the change speed mechanism, a source of pressure, means operated by the pressure for operating the clutch, means operated by the pressure for operating the change speed mechanism, means controlled by the speed of the driven means for controlling the operation of the last named means, and separate means for controlling the pressure operated clutch controlling means.

16. In combination with a clutch and change speed mechanism having a reverse speed position, means driven by the change speed mechanism, means controlled by the speed of the change speed driven means to vary the change speed mechanism, said means normally maintaining a speed change effecting position, means to disengage the clutch, manually operated means to prevent the engagement of the clutch, and means operated by the last named means to effect the reverse speed position.

17. In combination with a clutch and change speed mechanism, means driven by the change speed mechanism, means for operating the clutch, means for operating the change speed mechanism, means controlled by the speed of the driven means for controlling the operation of the last named means, said means normally maintaining a speed change effecting position, and means to actuate the last named means to effect the reverse speed position.

This specification signed this 5 day of August A. D. 1929.

PIERRE SANINE.

CERTIFICATE OF CORRECTION.

Patent No. 1,818,910.  Granted August 11, 1931, to

PIERRE SANINE.

It is hereby certified that the above numbered patent was erroneously issued to the inventor, said "Sanine and one-fourth to Claude E. Moore", whereas said patent should have been issued to the inventor, said Sanine, one-fourth to Mark R. McGarry, of N. Y., as assignee by direct and mesne assignments, and one-fourth to Claude E. Moore, of Nice, France, as shown by the records of assignments in this office; and that the said Letters Patent should be read with this correction therein that the same may conform to the record of the case in the Patent Office.

Signed and sealed this 29th day of September, A. D. 1931.

(Seal)

M. J. Moore,
Acting Commissioner of Patents.

CERTIFICATE OF CORRECTION.

Patent No. 1,818,910.  Granted August 11, 1931, to

PIERRE SANINE.

It is hereby certified that the above numbered patent was erroneously issued to the inventor, said "Sanine and one-fourth to Claude E. Moore", whereas said patent should have been issued to the inventor, said Sanine, one-fourth to Mark R. McGarry, of N. Y., as assignee by direct and mesne assignments, and one-fourth to Claude E. Moore, of Nice, France, as shown by the records of assignments in this office; and that the said Letters Patent should be read with this correction therein that the same may conform to the record of the case in the Patent Office.

Signed and sealed this 29th day of September, A. D. 1931.

(Seal)

M. J. Moore,
Acting Commissioner of Patents.